(No Model.) 2 Sheets—Sheet 1.
H. BAROTTE.
APPARATUS FOR PREPARING EXTRACT OF COFFEE.
No. 440,752. Patented Nov. 18, 1890.
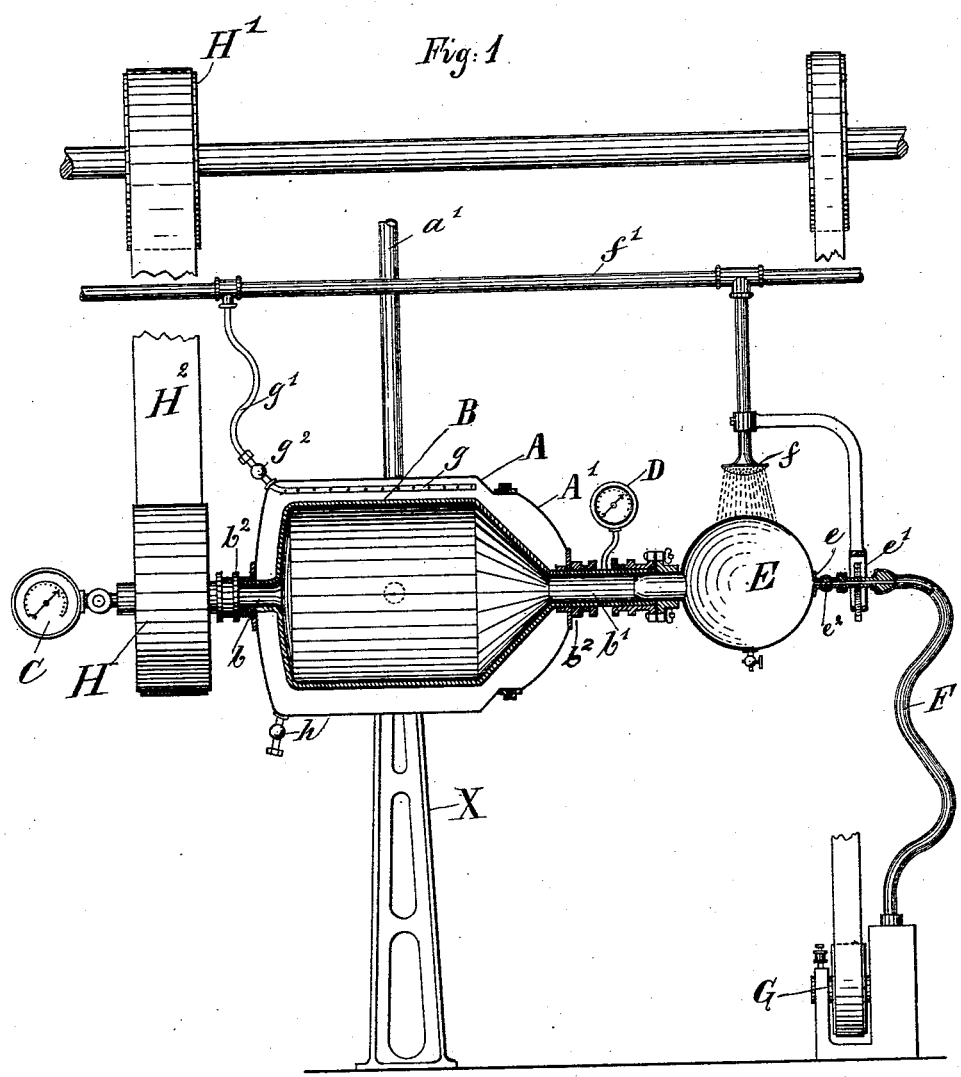

(No Model.) 2 Sheets—Sheet 2.

H. BAROTTE.
APPARATUS FOR PREPARING EXTRACT OF COFFEE.

No. 440,752. Patented Nov. 18, 1890.

WITNESSES:

INVENTOR:
Henri Barotte,
By Henry Connett
Attorney.

UNITED STATES PATENT OFFICE.

HENRI BAROTTE, OF PARIS, FRANCE, ASSIGNOR TO BAROTTE, MEYER & COMPAGNIE, OF SAME PLACE.

APPARATUS FOR PREPARING EXTRACT OF COFFEE.

SPECIFICATION forming part of Letters Patent No. 440,752, dated November 18, 1890.

Application filed September 11, 1890. Serial No. 364,646. (No model.) Patented in France May 4, 1887, No. 183,337, and in England December 10, 1889, No. 19,882.

*To all whom it may concern:*

Be it known that I, HENRI BAROTTE, a citizen of the Republic of France, and a resident of Paris, France, have invented certain Improvements in Apparatus for Preparing Extract of Coffee, (for which patents have been granted in France, No. 183,337, dated May 4, 1887, and in Great Britain, No. 19,882, dated December 10, 1889,) of which the following is a specification.

My invention relates to an improved apparatus for effecting the extraction of the volatile aromatic principles of coffee and the like, and the principal object of the invention is to provide an efficient apparatus for effecting such extraction in accordance with the improved process described and claimed in my application for Letters Patent of the United States, filed April 11, 1890, Serial No. 340,120, all as will be more fully hereinafter described.

In order that my improvements may be the better understood, I have shown them embodied in an apparatus in the accompanying drawings, wherein—

Figure 3:
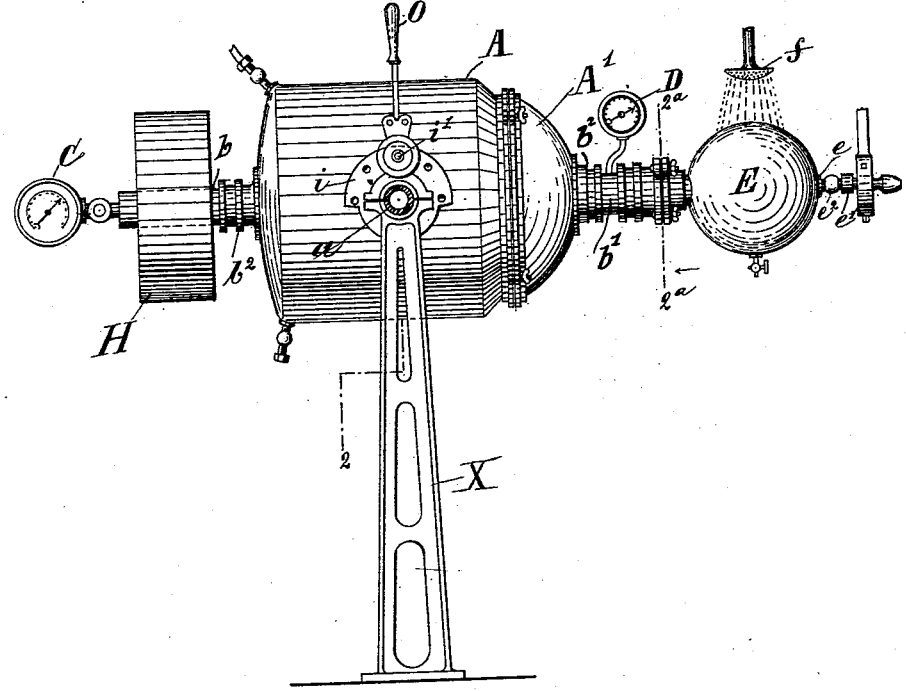
Figure 2:
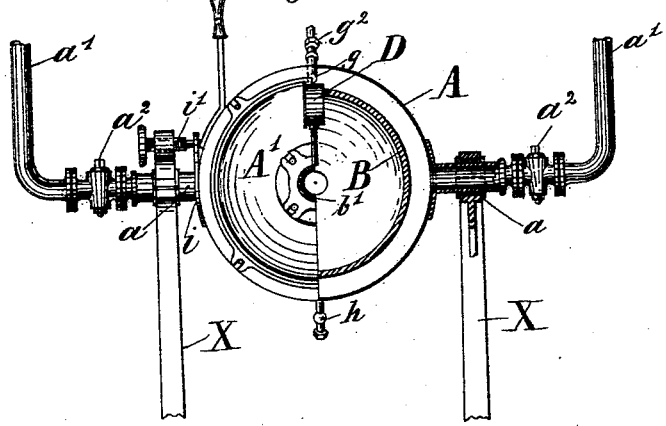

Figure 1 is a longitudinal vertical mid-section of said apparatus. Fig. 2 is a transverse section of same in two planes, the right half in the plane indicated by line 2 2 in Fig. 3 and the left half in the plane indicated by line $2^a$ $2^a$ in said figure. Fig. 3 is a side elevation of the apparatus.

I will state in a general way that my apparatus comprises a steam-tight cylinder or steam-receptacle mounted on trunnions, so that it may be tilted, and forming a jacket for another steam-tight cylinder, drum, or vessel rotatively mounted within said jacket and adapted to be rotated on journals arranged with their axes at right angles to those of the trunnions of the jacket. This inner drum communicates with a condenser and is provided with a thermometer and vacuum-gage.

A represents the jacket, which is mounted on hollow trunnions $a$ in a suitable frame X and adapted to receive steam through pipes $a'$, provided with controlling-cocks $a^2$. A' is the removable head of the jacket, which is secured by bolts, screws, or other suitable fastenings.

B is the inner receptacle, drum, or cylinder. It has hollow end journals $b$ and $b'$, which find bearings at $b^2$ in the respective ends of the jacket A. The journal $b$ is provided with a thermometer C, and the journal $b'$ is in like manner furnished with a vacuum-gage D. To the outer end of the journal $b'$ is removably secured in any suitable manner a condenser E, which will be in the form of a globe, by preference. Opposite to the point of attachment of the condenser to the journal of the drum B and aligned with the axis of the said journal is a nipple $e$ on the condenser, which is coupled, through the medium of a stuffing-box $e'$, with a flexible pipe F, leading to an exhauster or air-pump G of any kind. The nipple $e$ is furnished with a controlling-cock $e^2$.

Above the condenser E is placed a nozzle or sprinkler $f$, coupled to a cold-water pipe $f'$, coming from any source of supply. The purpose of this device is to sprinkle the condenser and keep it cool.

Within the jacket A and above the cylinder B is arranged a sprinkling-pipe $g$, which receives cold water from a pipe $g'$, and is provided with a cock $g^2$. The purpose of this sprinkler is to cool the cylinder B. The water is drawn from the jacket A by means of a cock $h$ at its bottom.

Rotation may be imparted to the cylinder B by any known means. As herein shown, the cylinder is provided with a pulley H on its journal $b$, and it is driven from a pulley H' on an overhead shaft through the medium of a belt $H^2$. The jacket is held in position and stopped against tilting on its trunnions by means of a plate $i$, fixed thereto, and provided with a hole or recess to receive a pin or screw $i'$, which passes through a hole in the upper extremity of the frame X. By withdrawing this screw the jacket, together with the inner drum and the condenser, is free to tilt or rock on its trunnions. The belt $H^2$ may be thrown off when the apparatus is to be tilted. To fix or secure the apparatus in its tilted position, the plate $i$ has or may have a series of holes, as shown in Fig. 3, to receive the screw $i'$.

Having now described the apparatus, I will briefly describe the manner in which it is to be used, premising, however, that the process of extracting the essence or aromatic principle and utilizing the same is described and claimed in my before-mentioned application, Serial No. 340,120.

The condenser E is removed and the apparatus tilted on the trunnions $a$, so as to turn up the open end or mouth of the hollow journal $b'$. The roasted and ground coffee is introduced into the cylinder B, the condenser again coupled on, and the apparatus brought down to a horizontal position again, where it will be fixed by the screw $i'$. The air is now exhausted from the cylinder B and condenser E by means of the exhauster G and the cylinder set to rotating by means of the pulley and belt. Superheated steam is now admitted through the trunnions $a$ to the jacket A or through one of said trunnions, and this effects a distillation of the coffee in the cylinder. When the vacuum-gage indicates a reduction, the vacuum should be re-established, and it should never fall below sixty-five centimeters of mercury. When the thermometer indicates 100° centigrade, the internal pressure is permitted to rise, and when the vacuum-gage indicates no more than ten centimeters of vacuum the steam supply is cut off, the temperature being then about 200° centigrade. The apparatus is now allowed to stand for five or ten minutes, during which the vacuum will fall to zero and the thermometer will rise to about 210° centigrade. At this point the cooling begins by injecting small quantities of cold water into the jacket A through the pipe $g$. The condenser E will of course be kept cool during the whole of the operation by means of spray from the sprinkler above it, and when the apparatus shall have been cooled off rotation of the cylinder ceases, air is admitted, and the distillate will be found in the condenser in the form of yellowish or reddish liquid.

I am aware that it is not new to provide a drier having a rotary foraminous drum mounted within a casing with a condenser and exhauster to remove the vapors. This apparatus would not effect the object sought by me. I employ a plain steam-tight revolving receptacle, to the inner surface of which the coffee to be distilled has free access, and an inclosing steam-tight jacket, to which superheated steam of known temperature and tension may be admitted for effecting the dry distillation of the coffee by the contact of the steam with the outer surface of said inner receptacle. This enables the operator to regulate the temperature with a degree of accuracy wholly unattainable by the use of products of combustion from a furnace such as has been employed for roasting coffee-beans. This construction also enables me to dispense with foraminous drums or drum-linings to preserve the coffee from contact with the drum-wall, and to thus assure the same, or substantially the same, temperature for the coffee that is possessed by the superheated steam, the thermometer and gage being the guide for both.

Having thus described my invention, I claim—

1. The combination of a tight steam-jacket A, having an inlet for superheated steam, a rotatively-mounted steam-tight receptacle B within said jacket, a condenser connected with the tubular journal of the said receptacle, and an exhauster connected with said condenser, said receptacle being provided with a thermometer and a vacuum-gage for ascertaing, respectively, the temperature and the gaseous pressure within the same.

2. The combination of a frame, a tight steam-jacket A, mounted therein to rock on trunnions, one of which is tubular and connected with a pipe for the admission of superheated steam to the jacket, the said pipe, the steam-tight receptacle B, mounted rotatively within said jacket on tubular journals, the condenser E, connected with the receptacle, and the exhauster connected with said condenser, the latter being secured removably to the receptacle at its filling-inlet.

3. The combination of the tight steam-jacket A, provided with an inlet for superheated steam, the steam-tight receptacle B, rotatively mounted within said jacket on hollow journals which project out from the latter, and the sprinkling-pipe $g$, arranged within the steam-jacket over the receptacle B and connected with a water-supply, the said receptacle being provided with a thermometer and vacuum-gage.

In witness whereof I have hereunto signed my name in the presence of two subscribing witnesses.

HENRI BAROTTE.

Witnesses:
PAUL MEYER,
R. J. PRESTON.